United States Patent [19]

Posnansky

[11] 4,074,678
[45] Feb. 21, 1978

[54] METHOD AND APPARATUS FOR HEATING A FLUID MEDIUM BY MEANS OF SOLAR ENERGY

[76] Inventor: Mario Posnansky, Pappelweg 4,, 3072 Ostermundigen, Switzerland

[21] Appl. No.: 696,873

[22] Filed: June 17, 1976

Related U.S. Application Data

[63] Continuation-in-part of Ser. No. 537,677, Dec. 30, 1974, abandoned.

[30] Foreign Application Priority Data

Jan. 7, 1974 Switzerland .......................... 113/74

[51] Int. Cl.² ............................................... F24J 3/02
[52] U.S. Cl. .................................. 126/271; 126/270; 165/183
[58] Field of Search ............... 126/270, 271; 237/1 A; 165/183; 60/641

[56] References Cited

U.S. PATENT DOCUMENTS

| | | | |
|---|---|---|---|
| 1,575,309 | 3/1926 | Anderson | 126/271 |
| 2,205,378 | 6/1940 | Abbot | 126/271 |
| 3,884,217 | 5/1975 | Wartes | 126/271 |
| 3,927,659 | 12/1975 | Blake | 126/271 |
| 3,968,786 | 7/1976 | Spielberg | 126/271 |

Primary Examiner—Kenneth W. Sprague
Assistant Examiner—James C. Yeung

[57] ABSTRACT

A receiver for collection of concentrated solar energy comprising a tube permeable to solar radiation and an elongated body capable of absorbing such radiation disposed within the transparent tube. The body comprises a series of vanes depending from a common center where the angle between two adjoining vanes is not greater than 72°.

6 Claims, 7 Drawing Figures

FIG. 2
FIG. 3
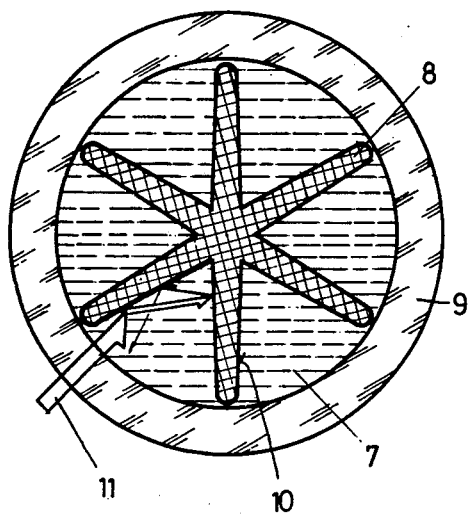
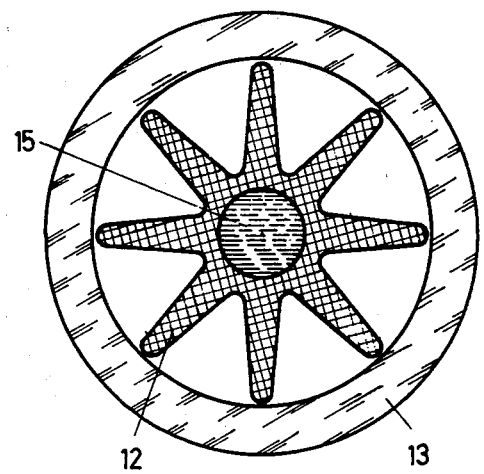
FIG. 5
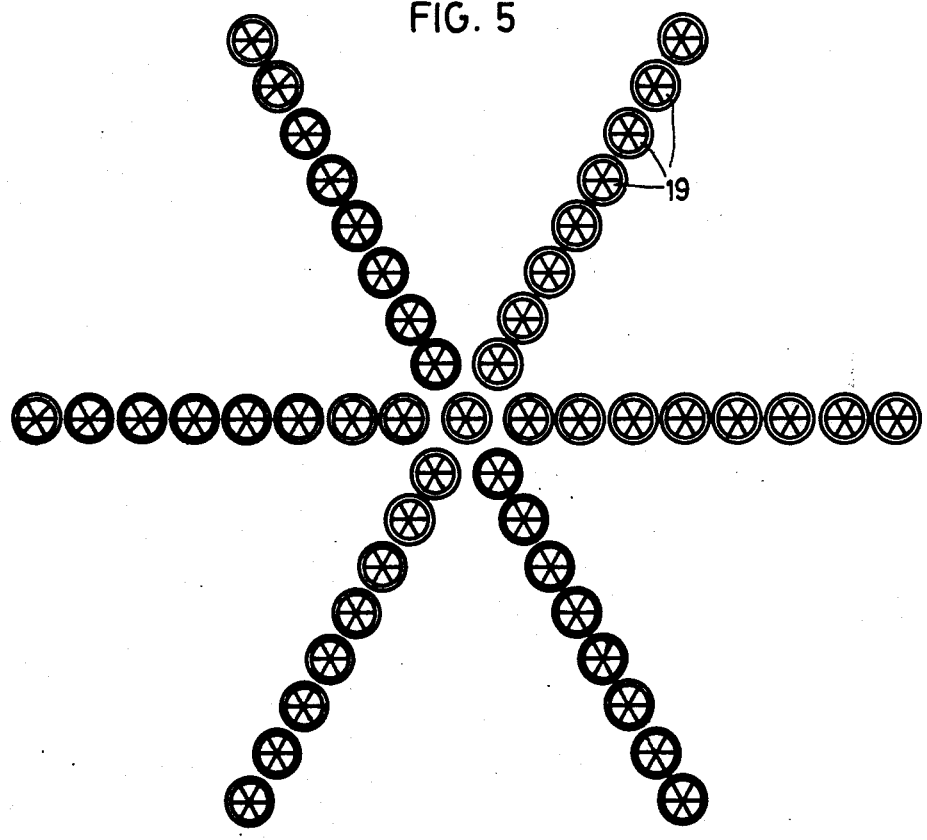

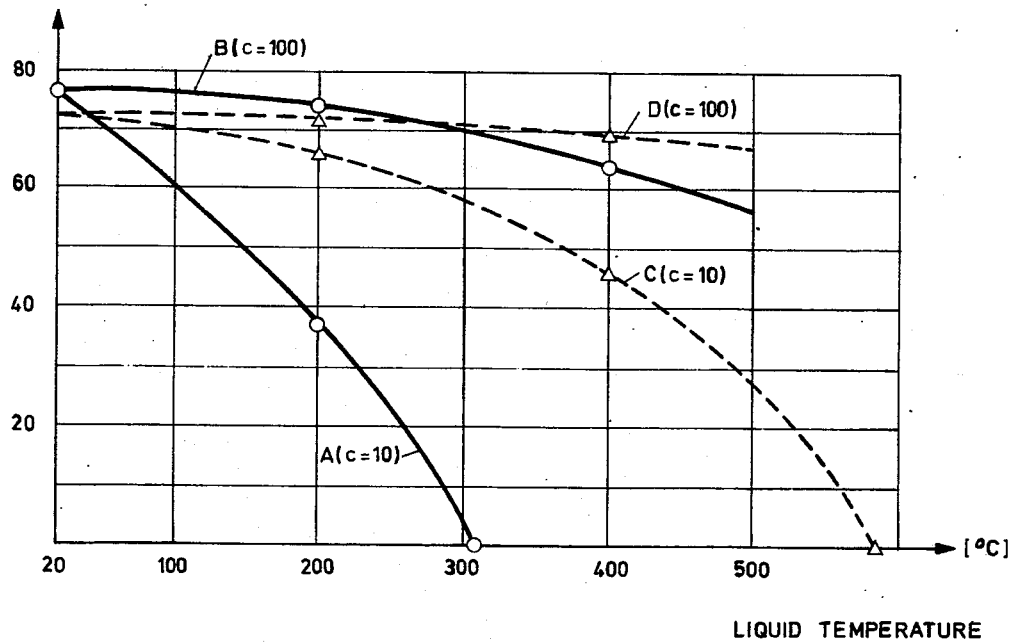
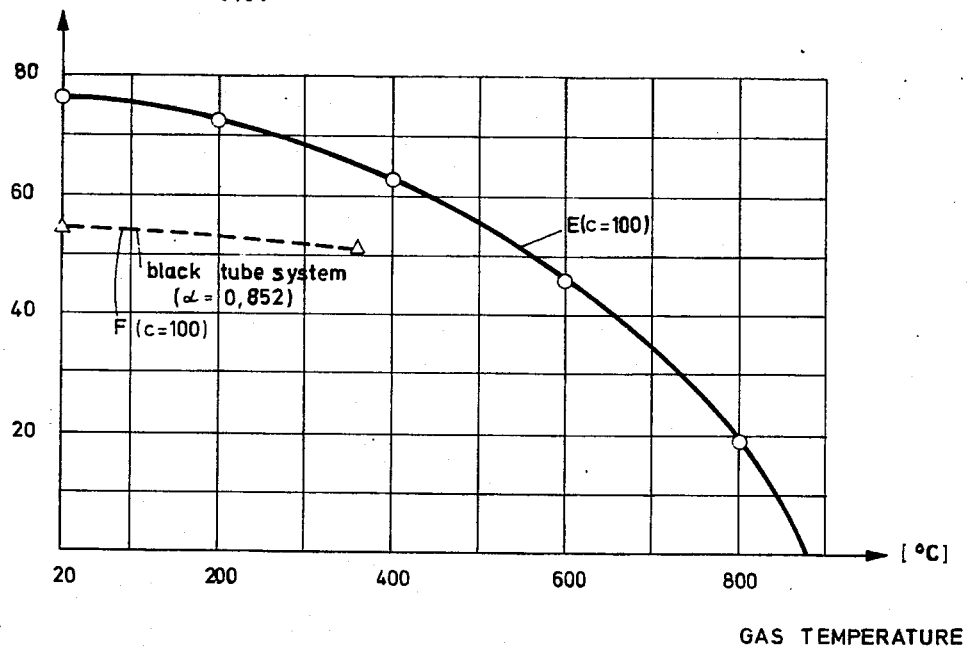

METHOD AND APPARATUS FOR HEATING A FLUID MEDIUM BY MEANS OF SOLAR ENERGY

This invention relates to a receiver for concentrated solar radiation utilized for heating a substantially transparent fluid and is a Continuation-In-Part of U.S. Pat. application Ser. No. 537,677 filed Dec. 30, 1974, abandoned by the inventor.

There have been several attempts in the past to utilize solar energy by converting it into another energy form. Solar energy collectors generally consist of a focusing means for concentrating solar radiation into a defined area, a receptor means or receiver disposed about that area for receiving the intensified, concentrated solar radiation and means within the receiver for absorbing the solar energy. This means for absorption is generally either a so-called black fluid located within the receiver, or a "black body" located within the receiver or, alternatively, forming the receiver itself with fluid disposed therein.

One of the major problems with all of these devices is that they are inefficient. One of the means for combating this inefficiency is taught in U.S. Pat. No. 1,683,266 issued to Shipman. The device shown in this patent contemplates the re-reflection of solar rays from a "black body" pipe located along the focal length of a focusing mirror, back to the mirror itself.

Another prior art device disclosed in U.S. Pat. No 1,575,309 issued to Anderson relates to the location of a "black body" within the confines of a hollow, transparent receiving tube. This "black body" consists of four blades or fins with each of the fins being substantially perpendicular to the one on either side of it. Solar radiation is focused through the receiving tube and onto the fins, where it is converted to heat energy and heats water surrounding it. The water which is converted to steam, is then utilized in conventional ways. Due to the anode separating the fins, there is only minimal re-reflection of solar rays between them.

The concept of using a "black body" as described in Anderson has several drawbacks. Firstly, black coloring agents utilized to produce the "black body" effect are expensive and the coloring agents have to be renewed often because of the bleaching effect incurred at the high temperatures at the surface of the "black body". Also, the color coating acts as an insulating layer, thereby reducing the efficiency of the system to some extent.

In addition, for high concentration ratios, i.e., those on the order of 100–1,000 or more, successful heat transfer is difficult because the gaseous fluid must be heated to temperatures on the order of 400°–800° C. and the wall temperatures become extremely high with concomitant material failure. (The term "concentration" as used throughout the specification, indicates the ratio of the amount of radiation falling on a given defined surface area after radition has been focused as compared to the amount of radiation which would normally fall on the same surface area without focusing of the random rays. In other words, a concentration of 50 means that 50 times more radiation has been impinging upon a defined surface area than would have been impinging upon it without focusing.)

This invention contemplates utilizing a receiver for concentrated solar radiation designed to heat a substantially transparent fluid wherein the receiver tube is a transparent body permeable to solar radiation and there is disposed within the tube a body having a multiplicity of vanes or blades united at a common axis. The absorptive bodies of this invention can be extruded and, therefore, inexpensively produced. The blades are separated from each other at the common axis by an angle of not greater than 72° and this body, which serves as the absorptive medium, is disposed within the tube so that there is a space between the inner wall of the tube and the body. In some embodiments this space is designed to be occupied by a substantially transparent fluid which is the energy carrying medium. This precise angle allows for increased efficiency by re-reflection between the various blades of the incoming solar radiation. Furthermore, because there is re-reflection, expensive black coating need not be utilized because less initial absorption will be counterbalanced by the subsequent reabsorption of the re-reflected rays. For example, if the body provides for a 75% absorption rate, then 25% is reflected, but of the reflected rays, 75% of those rays will be absorbed by the companion blade to which those rays were reflected. This continual absorption of re-reflected rays continues substantially indefinitely. Since the blades, because of this re-reflection features, need not be coated with expensive black coating, the system does not suffer from the defect associated with these coatings as set out above. Further, there is a more uniform production of energy from the system because there is no deterioration of these coatings to contend with.

The invention may be more clearly understood by reference to the accompanying FIGURES in which:

FIG.2 is an end cross-sectional view through a receiver within which a radiation-absorbing body is disposed;

FIG. 3 is a cross-sectional view of another embodiment of a receiver within which a radiation-absorbing body is disposed;

FIG. 5 is a cross-sectional view of an arrangement of receivers for building a high energy plant; and FIGS. 6 and 7 are graphs showing the collection efficiency as a function of the temperature of the liquid or gas conducting medium.

The principals of this invention will be explained by reference to an embodiment featuring a parabolic-cylindrical reflector which concentrates the solar energy onto a focal line wherein the receiver is located and also for a tower receiver. It is well known in the art that other focusing means can be employed and the scope of this invention contemplates such usage.

Figure 1:
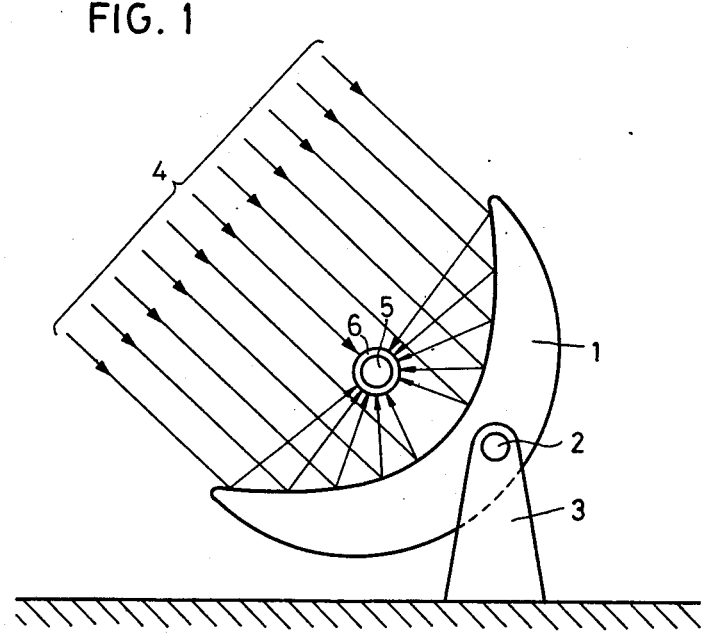
FIG. 1 is a schematic drawing of an apparatus for concentrating solar rays on a receiver containing a heat carrier.

The apparatus illustrated in FIG. 1 comprises a parabolic-cylindrical reflector 1 which is pivotally mounted about an axis 2 on a support 3 so that the reflector 1 may be adjusted according to the position of the sun. Solar radiation indicated at 4 striking the reflector 1 is concentrated along a focal line 5 represented in FIG. 1 by a point. A tubular receptacle 6 is disposed along the focal line 5 in such a way that the focal line and the center line of the receptacle 6 coincide. A fluid, e.g., water, steam or other gas, is conveyed through the tubular receptacle 6 with the receptacle forming a part of a closed cycle which may, e.g., comprise a pump for circulating the fluid and a heat exchanger or other means for utilizing the thermal energy taken up by the fluid.

The receptacle 6 is made of a material which allows solar radiation on the wave length of from 0.2 to 3 mircons to pass through it, so that these rays can act directly upon the fluid medium. One such material is quartz glass. Since it is particularly essential that the infrared rays penetrate into the receptacle, lead glass or hardened glass may also be used.

Any substance having an absorption band within the aforementioned wave range may be used as the medium serving as a heat carrier. In general, such substances are those having molecules which are more than diatomic, e.g., water, carbon dioxide or ammonia. The light permeable receptacle makes it possible for the radiant energy to reach the fluid.

FIG. 2 shows a cross-section of a receiver with the fluid located external to the vanes of the body 8 disposed in the transparent tube 9. As illustrated in FIG. 2, the receiving tube may be thickened and can, in fact, be utilized as a focusing lens.

Each two adjoining surfaces 10 of the body 8 in FIG. 2 enclose an angle of not more than 72° and, as shown, preferably about 60°, so that any solar rays which may be reflected from the lateral surfaces 10 would rebound onto a portion of the neighboring vane. This process would be repeated as many times as possible, as indicated by the arrow 11.

FIG. 3 shows a variation on the concept in which the fluid is located on the inside of a body containing the above-referred to vanes. In the center of the body 12, there is a longitudinal bore 14 serving to convey a fluid 15 which is to be heated. The surface area of the body 12 in FIG. 3 is more than twice as great as that of the inner surface of the tube 13 so that, in this embodiment also, the non-absorbed solar rays are re-reflected, striking the body 12 a number of times for substantially increased absorption.

Figure 4:
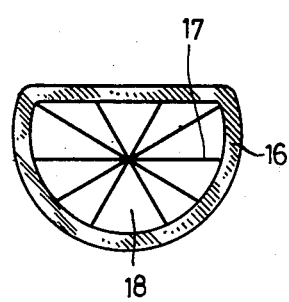
FIG. 4 is a cross-sectional view of a third embodiment of a receiver.

FIG. 4 illustrates a further embodiment. Inside the tube 16 a body 17 having the fins or vanes disposed at the proper angle is located. It should be noted that the permeability of the material of the tube 16 may be selectively chosen to prevent longer wave infrared radiation from passing through. This minimizes the amount of radiation from within the tube and is particularly favorable whenever it is desired that the fluid inside the receptacle or the body 17 be heated to such an extent that it begins to re-radiate. A long wave re-radiation of this nature would take place, for example, if the body were heated to about 600° C.

The system of FIG. 5 employing multiple receivers has the advantage of simplicity and high efficiency. High energy pulses can be worked with, resulting in a small size receiver 19. Due to the small diameter of the single receivers, a high working pressure is allowable. In the case of a central tower receiver, a plurality of receiver tubes will be disposed in the focal area and these tubes themselves would be arranged in a star-shaped configuration.

It should be noted that in the receivers of FIGS. 2, 3 and 4, the center of the finned body is not necessarily located at the center of the transparent tube, if the radiation comes in from a preferred side as is the case with cylindro-parabolic concentrators. Also, collection efficiency can be increased in these receivers by corrugating the peripheral area of the blades. The configuration in FIG. 2 is particularly advantageous because of its simplicity. It is especially useful, in addition, for high concentrations, i.e., those of 100–1,000 and greater and for temperatures above 600° C. It should be noted that for high temperatures, graphite or ceramic materials will be utilized for the absorptive body to eliminate the material failures associated with metal "black bodies".

The configuration of FIG. 3 is especially advantageous in the lower concentration-high temperature environment as can be seen from the graph at FIG. 6. The negative influence of wind is particularly reduced by this configuration because of the protective effect of the vanes body 8 around the fluid. FIG. 6 provides a comparison of the collection efficiency of the devices shown in FIGS. 2 and 3 for different concentrations when a liquid is used as the medium. The heavy solid curves A and B show the collection efficiency in percent as a function of the temperature of the liquid for two different radiation concentrations, i.e., 10 and 100, for the receiver according to FIG. 2. Curves C and D show the collection efficiency in percent of the function of the temperature of the liquid for the same two cncentrations for the receiver of FIG. 3. As can be seen from FIG. 6, the collection efficiency increases less rapidly with increasing temperature of the heated fluid when concentration increases. This means that a concentration of 100, the receivers of FIGS. 2 and 3 are well suited to temperature ranges of up to 300° C. and 500° C. respectively.

FIG. 7 shows the comparison of the collection efficiency for the embodiment of FIG. 1 when compared to a prior art system with a black tube utilized for the heating of gas. The solid curve E corresponds to the collection efficiency of the function of the temperature of a gas passed through the receiver of FIG. 2 using a radiation concentration of 100. The dashed curve F represents the collection efficiency of the function of the temperature of the gas when a black metal tube is used instead of the transparent tube 9, an absorption figure of $\alpha = 0.852$ being assumed for the calculation. Such a receiver is at best, only usable only up to a gas temperature of 370° C. because at higher temperatures, the metal tube will melt because it has a considerably higher temperature than the gas being conveyed therein.

The reason for the improved efficiency of the receivers of this invention when compared to the previously known installations in which the heat carrier fluid is conveyed in a metal pipe is that, for the same power density, the radiation losses are substantially lower. These losses include both primarily reflected radiation because no optimum absorptive "black body" can be made and secondarily, radiated energy as a result of the elevated outer wall temperature of the pipe. This is compared to the temperature of the light permeable receiver utilized in the subject invention in which the receiver body itself will, theoretically, have a temperature which is at most, the same as that of the fluid. This is in contrast with the situation utilizing metal pipe in which the pipe itself must be at a higher temperature so that the heat transfer to the medium is accomplished. As can readily be seen, the power density, i.e., the amount of energy transferrable to the medium per unit of time and per unit of area within the method described above, is substantially greater than previously known methods. Moreover, the temperature stability limits of the material from which the receptacle is made are not exceeded even when the concentration of the solar radiation is very high.

Many other alternatives will suggest themselves to those with reasonabe skill in the art with regard to the teachings of the subject application and, as indicated above, there are several variants of well known components which are contemplated within the ambit of this disclosure.

Having fully and completely disclosed the invention we hereby claim:

1. A receiver for concentrated solar radiation designed to heat a substantially transparent fluid, comprising a tube permeable to solar light radiation, an elongated body capable of absorbing solar radiation disposed within said tube, said body including a series of vanes depending from a common axis, said vanes being disposed about said common axis in a star-like configuration, with inner edges thereof substantially adjacent to each other, so that adjoining vanes are separated by an angle of not more than 72°, and said body having an outer surface area at least twice as great as the inner surface area of said tube, so that light radiation impinging on the outer surface thereof is being repeatedly reflected by the surface thereof for substantially complete absorption thereby.

2. The receiver according to claim 1, in which the peripheral area of said vanes is corrugated.

3. The receiver according to claim 1, in combination with a plurality of such receivers, said receivers reduced in size and arranged in a star-shaped configuration for construction of high-power installations.

4. The receiver of claim 1 in which said tube has an inner wall spaced from said body and said space between said inner wall and said body forms a space for said fluid.

5. The receiver according to claim 1 in which said body has at least eight radially extending fins.

6. The receiver according to claim 1 in which said body has a longitudinal bore in the center thereof for conveying said fluid.

* * * * *